United States Patent
Chen et al.

(10) Patent No.: US 12,089,309 B2
(45) Date of Patent: Sep. 10, 2024

(54) COLOR TEMPERATURE CONTROL METHOD AND SYSTEM FOR STAGE LAMP, COMPUTER DEVICE, AND STORAGE MEDIUM

(71) Applicant: GUANGZHOU YAJIANG PHOTOELECTRIC EQUIPMENT CO., LTD., Guangdong (CN)

(72) Inventors: Zhiman Chen, Guangdong (CN); Rongfeng Huang, Guangdong (CN); Guohai Wang, Guangdong (CN)

(73) Assignee: GUANGZHOU YAJIANG PHOTOELECTRIC EQUIPMENT CO., LTD., Guangzhou (CN)

( * ) Notice: Subject to any disclaimer, the term of this patent is extended or adjusted under 35 U.S.C. 154(b) by 114 days.

(21) Appl. No.: 17/964,132

(22) Filed: Oct. 12, 2022

(65) Prior Publication Data

US 2023/0046389 A1    Feb. 16, 2023

Related U.S. Application Data

(63) Continuation of application No. PCT/CN2020/117965, filed on Sep. 26, 2020.

(30) Foreign Application Priority Data

Sep. 14, 2020 (CN) .......................... 202010959251.8

(51) Int. Cl.
*H05B 47/105* (2020.01)
*H05B 47/165* (2020.01)

(52) U.S. Cl.
CPC ......... *H05B 47/105* (2020.01); *H05B 47/165* (2020.01)

(58) Field of Classification Search
CPC .... H05B 47/105; H05B 47/165; H05B 47/10; H05B 47/155; H05B 45/22; H05B 47/11; Y02B 20/40
USPC ......................................................... 315/297
See application file for complete search history.

(56) References Cited

U.S. PATENT DOCUMENTS

| | | | |
|---|---|---|---|
| 2014/0104432 A1* | 4/2014 | Lee ......................... | H04N 5/272 348/143 |
| 2019/0164316 A1* | 5/2019 | Chen ...................... | H05B 47/10 |
| 2021/0410246 A1* | 12/2021 | Chen ...................... | H05B 45/22 |

(Continued)

*Primary Examiner* — Ryan Jager

(57) ABSTRACT

A color temperature control method in the present disclosure includes: obtaining color coordinates and illuminance of each monochromatic lamp, and obtaining, based on the illuminance and an illuminance proportion of a color temperature, initial illuminance data of the monochromatic lamp at a current color temperature; calculating a coordinate difference between target color coordinates and mixed color coordinates obtained by performing illuminance mixing on the initial illuminance data; when the coordinate difference is within a first difference range, calculating illuminance changes of R and B based on the mixed color coordinates, the target color coordinates, correction coordinates of R, and correction coordinates of B; and obtaining latest channel values of R and B based on the illuminance changes of R and B, and regulating, based on the latest channel values, the color temperature of each monochromatic lamp on which color mixing is performed.

8 Claims, 5 Drawing Sheets

(56) References Cited

U.S. PATENT DOCUMENTS

2022/0283479 A1\* 9/2022 Chen ..................... H04N 23/65
2023/0046389 A1\* 2/2023 Chen ................... H05B 47/105

\* cited by examiner

```
                                              ┌─ S1011
┌──────────────────────────────────────────────────┐
│  Obtain the illuminance and the color coordinates of │
│ each monoChromatic lamp, namely, Er and (xr, yr), Eg │
│  and (xg, yg), Eb and (xb, yb), Ea and (xa, ya), El and │
│              (xl, yl), and Ec and (xc, yc)           │
└──────────────────────────────────────────────────┘
                        │
                        ▼                     ┌─ S1012
┌──────────────────────────────────────────────────┐
│         Obtain, based on the illuminance of each     │
│  monochromatic lamp and illuminance proportions of   │
│   given color temperatures R100, G100, B100, A100,   │
│      L100, and C100, initial illuminance data of the │
│ monochromatic lamp at the current color temperatures,│
│  namely, E*R100, E*G100, E*B100, E*A100, E*L100,     │
│                    and E*C100                        │
└──────────────────────────────────────────────────┘
```

FIG. 2

COLOR TEMPERATURE CONTROL METHOD AND SYSTEM FOR STAGE LAMP, COMPUTER DEVICE, AND STORAGE MEDIUM

CROSS REFERENCE TO RELATED APPLICATIONS

The present application is a Continuation Application of PCT Application No. PCT/CN2020/117965 filed on Sep. 26, 2020, which claims the benefit of Chinese Patent Application No. 202010959251.8 filed on Sep. 14, 2020. All the above are hereby incorporated by reference in their entirety.

TECHNICAL FIELD

The present disclosure relates to the technical field of dimming of lamps, and in particular, to a color temperature control method and system for a stage lamp, a computer device, and a storage medium.

BACKGROUND

With the continuous development of economy, an annual output of stage lamps is also increasing. As a special type of downlight, stage lamps mainly include lamps for flood lighting and projection for stages, television, films, and shooting locations, spotlights for guiding audience's sight and highlighting a theme or a protagonist of performance, and magic lamps for rendering atmosphere of stage performance, flickering, and changing an intensity, a color, an angle, and a pattern of lamplight.

At present, a color temperature with a high color rendering index of a color stage lamp is obtained by disposing built-in channels of different colors. However, due to a difference between lamp beads of different lamps, a color temperature drift occurs and a color rendering index is decreased, resulting in a difference between same color temperatures of different lamps.

SUMMARY

In view of this, it is necessary to provide a color temperature control method and system for a stage lamp, a computer device, and a storage medium to resolve the above technical problems. The method can resolve a problem that there is a difference between same color temperatures of different lamps because a color temperature drift occurs and a color rendering index is decreased due to a difference between lamp beads of different lamps.

According to a first aspect, an embodiment of the present disclosure provides a color temperature control method for a stage lamp. The method is executed by a regulating device configured to control color temperature regulation of a lamp, and includes the following steps:

obtaining color coordinates and illuminance of each monochromatic lamp, and obtaining, based on the illuminance and an illuminance proportion of a color temperature, initial illuminance data of the monochromatic lamp at a current color temperature;

calculating a coordinate difference between target color coordinates and mixed color coordinates obtained by performing illuminance mixing on the initial illuminance data;

when the coordinate difference is within a first difference range, calculating illuminance changes of R and B based on the mixed color coordinates, the target color coordinates, correction coordinates of R, and correction coordinates of B; and obtaining latest channel values of R and B based on the illuminance changes of R and B, and regulating, based on the latest channel values, the color temperature of each monochromatic lamp on which color mixing is performed.

Further, the method includes:
when the coordinate difference is within a second difference range, calculating an illuminance value of each color at a given next color temperature based on the given next color temperature and an illuminance proportion of the current color temperature, and performing the step of calculating illuminance changes of R and B based on the mixed color coordinates, the target color coordinates, correction coordinates of R, and correction coordinates of B.

Further, a method for obtaining, based on the illuminance and the illuminance proportion of the color temperature, the initial illuminance data of the monochromatic lamp at the current color temperature includes:

obtaining the illuminance and the color coordinates of each monochromatic lamp, namely, Er and (xr, yr), Eg and (xg, yg), Eb and (xb, yb), Ea and (xa, ya), El and (xl, yl), and Ec and (xc, yc); and obtaining, based on the illuminance of each monochromatic lamp and illuminance proportions of given color temperatures R100, G100, B100, A100, L100, and C100, initial illuminance data of the monochromatic lamp at the current color temperatures, namely, E*R100, E*G100, E*B100, E*A100, E*L100, and E*C100, where E represents a minimum value of Er/R100, Eg/G100, Eb/B100, Ea/A100, El/L100, and Ec/C100.

Further, a model for calculating the illuminance changes of R and B based on the mixed color coordinates, the target color coordinates, the correction coordinates of R, and the correction coordinates is as follows:

$$\Delta Eb = Ei * Kb$$

$$\Delta Er = Ei * (1 + Kb) * Er$$

$$Kb = \left(\frac{y - yi}{yb - y} * \frac{yb}{yi}\right)$$

$$Kr = \left(\frac{y0 - y}{yr - y0} * \frac{yr}{y}\right)$$

$$y = \frac{xr - xb + K_1 * yb - K_2 * yr}{K_1 - K_2}, K_1 = \frac{xi - xb}{yi - yb}, K_2 = \frac{x0 - xr}{y0 - yr}$$

where $\Delta Eb$ and $\Delta Er$ represent the illuminance changes, (xi, yi) represents current color coordinates, (x0, y0) represents the target color coordinates, (xr, yr) represents the correction coordinates of R, and (xb, yb) represents the correction coordinates of B.

Further, a method for obtaining the latest channel values of R and B based on the illuminance changes of R and B, and regulating, based on the latest channel values, the color temperature of each monochromatic lamp on which color mixing is performed includes:

obtaining the latest channel values of R and B based on current illuminance and corresponding illuminance changes of the lamp in the colors R and B respectively, and overriding and replacing, based on the latest channel values, the color temperature of each monochromatic lamp on which color mixing is performed.

Further, the first difference range is 0.003≤ε, and the second difference range is 0≤ε<0.003.

According to another aspect, an embodiment of the present disclosure further provides a color temperature control system for a stage lamp, where the system includes:

an illuminance obtaining module, configured to obtain color coordinates and illuminance of each monochromatic lamp, and obtain, based on the illuminance and an illuminance proportion of a color temperature, initial illuminance data of the monochromatic lamp at the current color temperature;

an illuminance mixing module, configured to calculate a coordinate difference between target color coordinates and mixed color coordinates obtained by performing illuminance mixing on the initial illuminance data;

an illuminance change module, configured to: when the coordinate difference is within a first difference range, calculate illuminance changes of R and B based on the mixed color coordinates, the target color coordinates, correction coordinates of R, and correction coordinates of B; and a color temperature regulating module, configured to obtain latest channel values of R and B based on the illuminance changes of R and B, and regulate, based on the latest channel values, the color temperature of each monochromatic lamp on which color mixing is performed.

Further, the illuminance obtaining module includes:

an obtaining unit, configured to obtain the illuminance and the color coordinates of each monochromatic lamp, namely, Er and (xr, yr), Eg and (xg, yg), Eb and (xb, yb), Ea and (xa, ya), El and (xl, yl), and Ec and (xc, yc); and a calculation unit, configured to obtain, based on the illuminance of each monochromatic lamp and illuminance proportions of given color temperatures R100, G100, B100, A100, L100, and C100, initial illuminance data of the monochromatic lamp at the current color temperatures, namely, E*R100, E*G100, E*B100, E*A100, E*L100, and E*C100, where E represents a minimum value of Er/R100, Eg/G100, Eb/B100, Ea/A100, El/L100, and Ec/C100.

An embodiment of the present disclosure further provides a computer device, including a memory, a processor, and a computer program stored in the memory and executable on the processor, where the processor executes the computer program to implement the following steps:

obtaining color coordinates and illuminance of each monochromatic lamp, and obtaining, based on the illuminance and an illuminance proportion of a color temperature, initial illuminance data of the monochromatic lamp at the current color temperature;

calculating a coordinate difference between target color coordinates and mixed color coordinates obtained by performing illuminance mixing on the initial illuminance data;

when the coordinate difference is within a first difference range, calculating illuminance changes of R and B based on the mixed color coordinates, the target color coordinates, correction coordinates of R, and correction coordinates of B; and obtaining latest channel values of R and B based on the illuminance changes of R and B, and regulating, based on the latest channel values, the color temperature of each monochromatic lamp on which color mixing is performed.

An embodiment of the present disclosure further provided a storage medium storing a computer program, where a processor executes the computer program to implement the following steps:

obtaining color coordinates and illuminance of each monochromatic lamp, and obtaining, based on the illuminance and an illuminance proportion of a color temperature, initial illuminance data of the monochromatic lamp at the current color temperature;

calculating a coordinate difference between target color coordinates and mixed color coordinates obtained by performing illuminance mixing on the initial illuminance data;

when the coordinate difference is within a first difference range, calculating illuminance changes of R and B based on the mixed color coordinates, the target color coordinates, correction coordinates of R, and correction coordinates of B; and obtaining latest channel values of R and B based on the illuminance changes of R and B, and regulating, based on the latest channel values, the color temperature of each monochromatic lamp on which color mixing is performed.

The above color temperature control method and system for a stage lamp, the above computer device, and the above storage medium can obtain color coordinates and illuminance of each monochromatic lamp, and obtain, based on the illuminance and an illuminance proportion of a color temperature, initial illuminance data of the monochromatic lamp at the current color temperature; calculate a coordinate difference between target color coordinates and mixed color coordinates obtained by performing illuminance mixing on the initial illuminance data; when the coordinate difference is within a first difference range, calculate illuminance changes of R and B based on the mixed color coordinates, the target color coordinates, correction coordinates of R, and correction coordinates of B; and obtain latest channel values of R and B based on the illuminance changes of R and B, and regulate, based on the latest channel values, the color temperature of each monochromatic lamp on which color mixing is performed. In this way, color temperatures of lamps with different lamp beads are consistent, improving reliability of color rendering of the lamps. In the embodiments of the present disclosure, when the coordinate difference between the color coordinates obtained after illuminance mixing and the target color coordinates is within the first difference range, the illuminance changes of R and B are calculated based on the mixed color coordinates, the target color coordinates, the correction coordinates of R, and the correction coordinates of B, to obtain the latest channel values of R and B based on the illuminance changes of R and B, and regulate, based on the latest channel values, the color temperature of each monochromatic lamp on which color mixing is performed. This avoids a problem that there is a difference between same color temperatures of different lamps because a color temperature drift occurs and a color rendering index is decreased due to a difference between lamp beads of different lamps, and satisfies actual application requirements.

BRIEF DESCRIPTION OF DRAWINGS

FIG. 2 is a specific schematic flowchart of step S101 in FIG. 1;

DESCRIPTION OF EMBODIMENTS

To make the objectives, technical solutions, and advantages of the present disclosure clearer, the present disclosure is further described in detail below with reference to the accompanying drawings and embodiments. It should be understood that the specific embodiments described herein are merely used to explain the present disclosure, rather than to limit the present disclosure.

Figure 1:
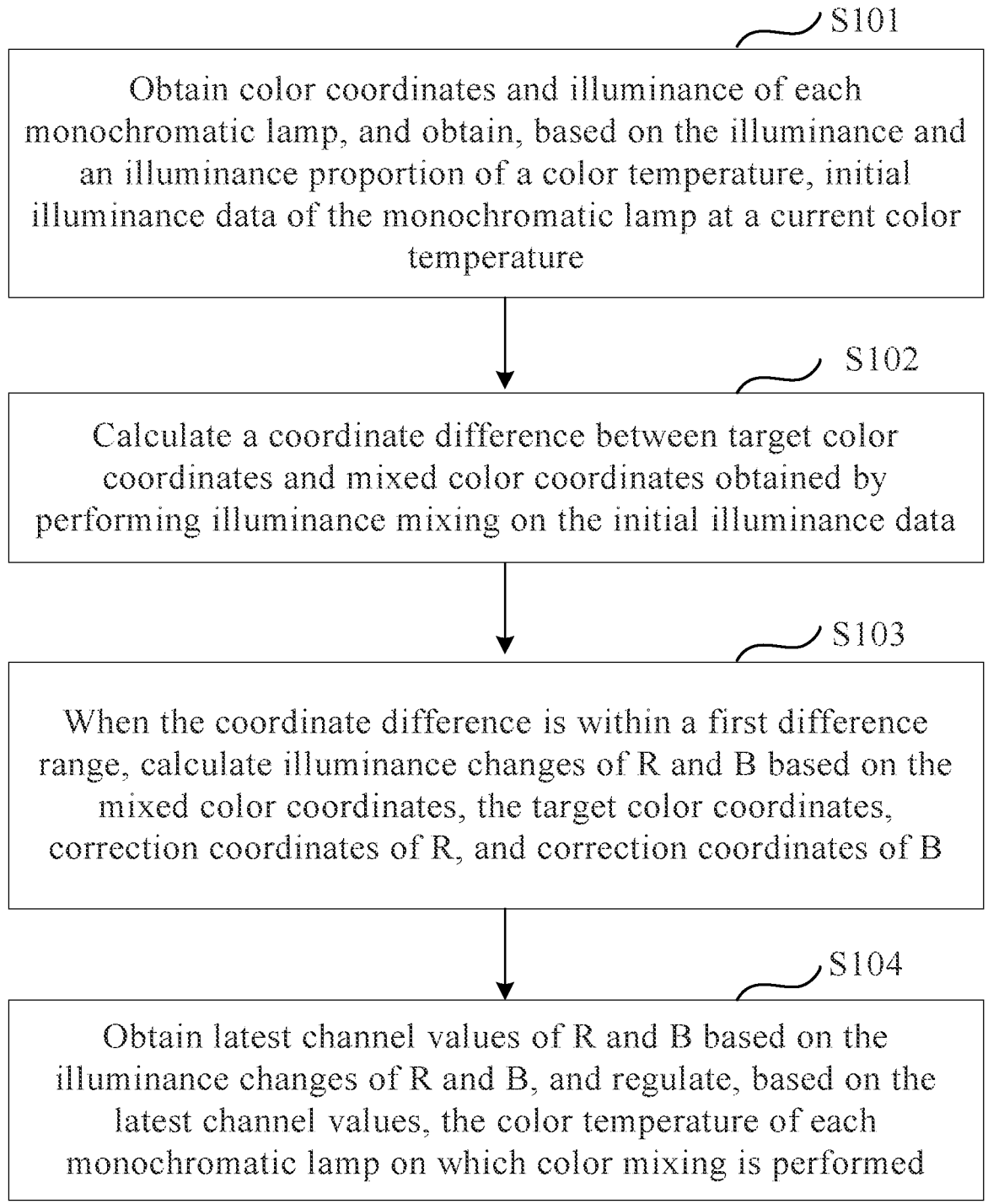
FIG. 1 is a schematic flowchart of a color temperature control method for a stage lamp according to an embodiment of the present disclosure.

A color temperature control method for a stage lamp in the present disclosure is executed by software or hardware of a regulating device (for example, an intelligent terminal or a server) configured to control color temperature regulation of a lamp. As shown in FIG. 1, the method includes steps S101 to S104.

Step S101: Obtain color coordinates and illuminance of each monochromatic lamp, and obtain, based on the illuminance and an illuminance proportion of a color temperature, initial illuminance data of the monochromatic lamp at the current color temperature.

The color coordinates and the illuminance of each monochromatic lamp are obtained through testing, and the illuminance proportion of the color temperature is built into a system with reference to the following records. The initial illuminance data of the lamp at the current color temperature is calculated based on the illuminance and the illuminance proportion of the color temperature.

Specifically, there are LEDs of a plurality of colors in the lamp (for example, the LEDs are represented by R, G, B, A, L, C). A lamp with at least five color light sources is used as an example. Color coordinates of each common color temperature and a proportional relationship between various colors at a color temperature with a high color rendering index are given, as shown in the following table:

| Color temperature | Color coordinates | | Illuminance proportion of each color temperature based on a previous color temperature | | | | | |
|---|---|---|---|---|---|---|---|---|
| K | x | y | R | G | B | A | L | C |
| 10000 | x100 | y100 | R100 | G100 | B100 | A100 | L100 | C100 |
| 8000 | x80 | y80 | R80 | G80 | B80 | A80 | L80 | C80 |
| 6500 | x65 | y65 | R80 | G65 | B65 | A65 | L65 | C65 |
| 5600 | x56 | y56 | R56 | G56 | B56 | A56 | L56 | C56 |
| 4500 | x45 | y45 | R45 | G45 | B45 | A45 | L45 | C45 |
| 4000 | x40 | y40 | R80 | G40 | B40 | A40 | L40 | C40 |
| 3200 | x32 | y32 | R32 | G32 | B32 | A32 | L32 | C32 |
| 3000 | x30 | y30 | R30 | G30 | B30 | A30 | L30 | C30 |
| 2700 | x27 | y27 | R27 | G27 | B27 | A27 | L27 | C27 |
| 1800 | x18 | y18 | R18 | G18 | B18 | A18 | L18 | C18 |

The above color coordinates and proportional relationships are obtained by using a corresponding algorithm model, and the illuminance proportion of each color is obtained when the rendering index is greater than 93. Users can increase or decrease some color temperatures and illuminance proportions based on actual needs.

Further, as shown in FIG. 2, a method for obtaining, based on the illuminance and the illuminance proportion of the color temperature, the initial illuminance data of the monochromatic lamp at the current color temperature includes the following steps.

Step S1011: Obtain the illuminance and the color coordinates of each monochromatic lamp, namely, Er and (xr, yr), Eg and (xg, yg), Eb and (xb, yb), Ea and (xa, ya), El and (xl, yl), and Ec and (xc, yc). Er represents illuminance of R, and (xr, yr) represents CIE1931 color coordinates of R; Eg represents illuminance of G, and (xg, yg) represents CIE1931 color coordinates of G; Eb represents illuminance of B, and (xb, yb) represents CIE1931 color coordinates of B; Ea represents illuminance of A, and (xa, ya) represents CIE1931 color coordinates of A; El represents illuminance of L, and (xl, yl) represents CIE1931 color coordinates of L; and Ec represents illuminance of C, and (xc, yc) represents CIE1931 color coordinates of C.

Step S1012: Obtain, based on the illuminance of each monochromatic lamp and illuminance proportions of given color temperatures R100, G100, B100, A100, L100, and C100, initial illuminance data of the monochromatic lamp at the current color temperatures, namely, E*R100, E*G100, E*B100, E*A100, E*L100, and E*C100. E represents a minimum value of Er/R100, Eg/G100, Eb/B100, Ea/A100, El/L100, and Ec/C100.

As described above, based on the illuminance of each monochromatic lamp and the illuminance proportion of the color temperature, the initial illuminance data of the monochromatic lamp at the current color temperature is obtained, to provide a necessary condition for color mixing and color temperature regulation of the lamp.

Step S102: Calculate a coordinate difference between target color coordinates and mixed color coordinates obtained by performing illuminance mixing on the initial illuminance data.

Specifically, the target color coordinates are preset as required, the mixed color coordinates and illuminance that are obtained by performing illuminance mixing on the initial illuminance data are tested, and whether the coordinate difference between the target color coordinates and the mixed color coordinates obtained after illuminance mixing is within a first difference range or a second difference range is determined. The first difference range or the second difference range is preset as required. The first difference range is $0.003 \leq \varepsilon$, and the second difference range is $0 \leq \varepsilon < 0.003$.

Step S103: When the coordinate difference is within the first difference range, calculate illuminance changes of R and B based on the mixed color coordinates, the target color coordinates, correction coordinates of R, and correction coordinates of B.

Specifically, a model for calculating the illuminance changes of R and B based on the mixed color coordinates, the target color coordinates, the correction coordinates of R, and the correction coordinates is as follows:

$$\Delta Eb = Ei * Kb$$

$$\Delta Er = Ei * (1 + Kb) * Er$$

$$Kb = \left(\frac{y - yi}{yb - y} * \frac{yb}{yi}\right)$$

-continued $$Kr = \left(\frac{y0-y}{yr-y0} * \frac{yr}{y}\right)$$

$$y = \frac{xr - xb + K_1 * yb - K_2 * yr}{K_1 - K_2}, K_1 = \frac{xi - xb}{yi - yb}, K_2 = \frac{x0 - xr}{y0 - yr}$$

where ΔEb and ΔEr represent the illuminance changes, (xi, yi) represents current color coordinates, (x0, y0) represents the target color coordinates, (xr, yr) represents the correction coordinates of R, (xb, yb) represents the correction coordinates of B, $E_i$ represents illuminance of a current color, and $E_r$ represents illuminance of R.

As described above, when the coordinate difference between the target color coordinates and the mixed color coordinates obtained by performing illuminance mixing on the initial illuminance data is within the first difference range, in other words, when a color difference after color mixing for the initial illuminance data is large, the illuminance changes of R and B are calculated based on the mixed color coordinates, the target color coordinates, the correction coordinates of R, and the correction coordinates of B, to regulate the color temperature of the lamp. This avoids a problem that there is a difference between same color temperatures of different lamps because a color temperature drift occurs and a color rendering index is decreased due to a difference between lamp beads of different lamps.

Further, when the coordinate difference is within the second difference range, an illuminance value of each color at a given next color temperature is calculated based on an illuminance proportion between the given next color temperature and the current color temperature, and the step of calculating illuminance changes of R and B based on the mixed color coordinates, the target color coordinates, correction coordinates of R, and correction coordinates of B is performed. It may be understood that when the coordinate difference is within 0.003≤e, in other words, when the color difference after color mixing for the initial illuminance data meets a requirement, the illuminance value of each color at the next color temperature is continuously tested and regulated, until different lamps have a same color temperature and the rendering index meets a requirement.

Step S104: Obtain latest channel values of R and B based on the illuminance changes of R and B, and regulate, based on the latest channel values, the color temperature of each monochromatic lamp on which color mixing is performed.

Specifically, the latest channel values of R and B are calculated based on current illuminance and corresponding illuminance changes of the lamp at the colors R and B respectively, and the current color temperature of each monochromatic lamp on which color mixing is performed is overridden and replaced based on the latest channel values.

In a specific embodiment, the method is applied to a color temperature control system for a stage lamp. The system includes a detection device, a processor, a regulating device, and a lamp. The detection device can detect illuminance data and color coordinate data of lamps of various colors, and send the illuminance data and the color coordinate data to the processor, so that the processor can obtain a latest channel value based on an illuminance change model and regulate a color temperature of each monochromatic lamp on which color mixing is performed.

A color lamp with six colors is used as an example. Illuminance proportions of the colors at each color temperature are determined by using a corresponding model, as shown in the following table:

| Color temperature K | Color coordinates | | Illuminance proportion of each color temperature based on a previous color temperature | | | | | |
|---|---|---|---|---|---|---|---|---|
| | x | y | R | G | B | A | L | C |
| 10000 | 0.2808 | 0.2882 | 1.17 | 12.65 | 2.58 | 10.49 | 14.35 | 1.11 |
| 6500 | 0.3145 | 0.3224 | 1.52 | 0.84 | 0.67 | 1.12 | 0.86 | 0.76 |
| 4000 | 0.3821 | 0.3781 | 1.41 | 0.71 | 0.44 | 1.19 | 0.79 | 0.56 |
| 3200 | 0.4243 | 0.3986 | 1.52 | 0.80 | 0.59 | 1.05 | 0.96 | 0.69 |
| 2700 | 0.4604 | 0.4103 | 1.11 | 0.71 | 0.50 | 1.04 | 0.89 | 0.71 |

The above data is stored in the processor.

Further, the detection device tests illuminance and color coordinates of each color, namely, 290.5 lx, (0.683, 0.3002); 488.3, (0.1761, 0.6824); 133.5, (0.1552, 0.0325); 562, (0.5315, 0.4076); 894, (0.4037, 0.5238; and 296, (0.0972, 0.251). Then, the detection device sends the above illuminance and color coordinates of each color to the processor.

Further, based on the illuminance of each color and an illuminance proportion of a given color temperature 1 (usually 10000 K) shown as follows:

| 1.17 | 12.65 | 2.58 | 10.49 | 14.35 | 1.11 |
|---|---|---|---|---|---|

E represents a minimum value of 290.5/1.17, 488.3/12.65, 133.5/2.58, 562/10.49, 894/14.35, and 296/1.11, namely, 488.3/12.65=38.6.

Further, initial illuminance data of all the colors at the color temperature is: 38.6*1.17=45.16 lx, 38.6*12.65=488.3 lx, 38.6*2.58=99.59 lx, 38.6*10.49=404.92 lx, 38.6*14.35=553.92 lx, and 38.6*1.11=42.85 lx.

Further, when mixed color coordinates (0.2724, 0.2657) after illuminance mixing and illuminance (1620 lx) through testing is obtained and a difference between the mixed color coordinates (0.2724, 0.2657) and the target color coordinates is greater than 0.003, a difference between the current color coordinates (xi, yi) and the target color coordinates (x0, y0) is calculated based on the following model:

$$\Delta Eb = Ei * Kb$$

$$\Delta Er = Ei * (1 + Kb) * Er$$

$$Kb = \left(\frac{y - yi}{yb - y} * \frac{yb}{yi}\right)$$

$$Kr = \left(\frac{y0 - y}{yr - y0} * \frac{yr}{y}\right)$$

$$y = \frac{xr - xb + K_1 * yb - K_2 * yr}{K_1 - K_2}, K_1 = \frac{xi - xb}{yi - yb}, K_2 = \frac{x0 - xr}{y0 - yr}$$

where ΔEb and ΔEr represent the illuminance changes, (xi, yi) represents the current color coordinates, (x0, y0) represents the target color coordinates, (xr, yr) represents the correction coordinates of R, and (xb, yb) represents the correction coordinates of B.

It is obtained that K1=−0.0108 and K2=−0.00764. In this case, the illuminance changes are as follows:

ΔEb=Ei*Kb=−0.0108*1620=−17.5

ΔEr=Ei*(1+Kb)*Kr=1620*(1−0.0108)*(−0.00764)=−12.25

Therefore, output illuminance of R and B is changed to Er=45.16−12.25=32.91 lx and Eb=99.59−17.5=82.09 lx respectively.

Further, the processor outputs the above test result to the regulating device, and the regulating device controls, based on the result, the lamp to output the illuminance of each color based on the result.

Further, when the mixed color coordinates, after illuminance mixing, obtained through testing are (0.2808, 0.2880), in compliance with a difference standard, the detection device tests a next color temperature, namely, 6500 K.

Further, the processor calculates output illuminance of each color at 6500K. The calculated output illuminance is as follows:
32.91*1.52=50.02 lx, 488.3*0.84=410.17 lx, 82.09*0.67=55 lx, 404.92*1.12=453.51 lx, 553.92*0.86=476.37 lx, and 42.85*0.76=32.57 lx. The processor outputs the above test result to the regulating device, and the regulating device controls, based on the result, the lamp to output the illuminance of each color based on the result. When the mixed color coordinates, after illuminance mixing, obtained through testing are (0.3151, 0.3204), in compliance with the difference standard, the detection device tests a next color temperature, namely, 4000 K. After all the color temperatures pass the test, output illuminance is shown in the following table:

lamps because a color temperature drift occurs and a color rendering index is decreased due to a difference between lamp beads of different lamps, and satisfies actual application requirements.

It should be understood that although the steps in the above flowchart are shown in sequence as indicated by the arrows, these steps are not necessarily performed in sequence as indicated by the arrows. Unless explicitly stated herein, the execution of these steps is not strictly limited in sequence, and these steps may be executed in other sequences. Moreover, at least some steps in the above flowchart may include a plurality of substeps or a plurality of phases, which are not necessarily executed at the same time, but may be executed at different time points. The execution order of these substeps or phases is not necessarily sequential, and these substeps or phases may be executed alternately with other steps or at least some substeps or phases of other steps.

Figure 3:
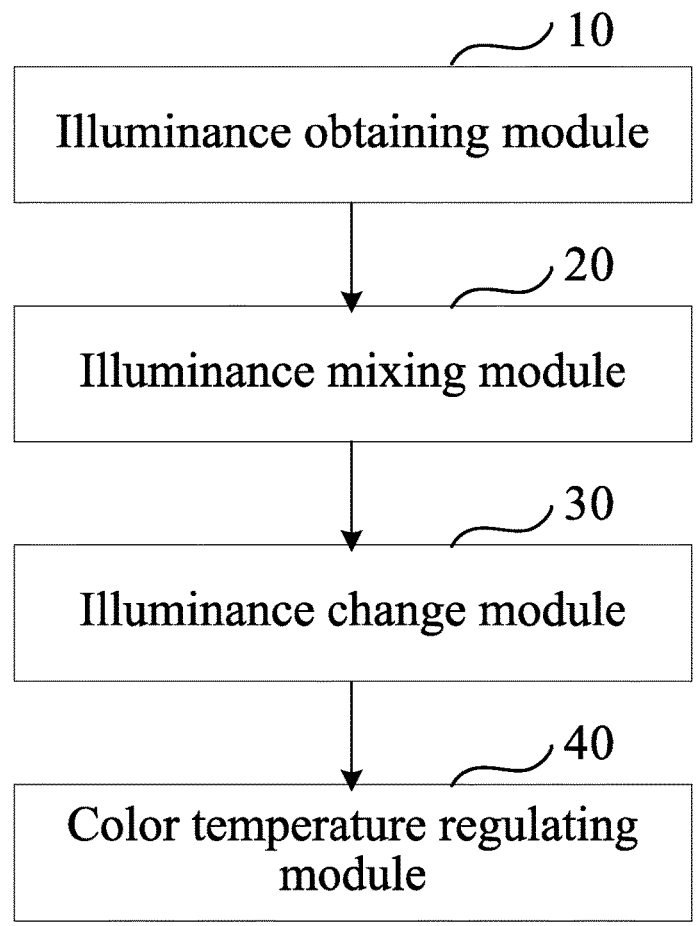
FIG. 3 is a structural block diagram of a color temperature control system for a stage lamp according to an embodiment of the present disclosure.

In an embodiment, as shown in FIG. 3, a color temperature control system for a stage lamp is provided. The system includes: an illuminance obtaining module 10, an illuminance mixing module 20, an illuminance change module 30, and a color temperature regulating module 40.

| Color temperature | Actually measured coordinates | | Output illuminance (lx) of each color | | | | | | Color rendering |
|---|---|---|---|---|---|---|---|---|---|
| K | x | y | R | G | B | A | L | C | index Ra |
| 10000 | 0.2808 | 0.2880 | 32.91 | 488.30 | 82.09 | 404.92 | 553.92 | 42.85 | 93 |
| 6500 | 0.3151 | 0.3204 | 50.02 | 410.17 | 55.00 | 453.51 | 476.37 | 32.57 | 92 |
| 4000 | 0.3829 | 0.3776 | 62.25 | 291.22 | 23.50 | 539.68 | 376.33 | 18.24 | 94 |
| 3200 | 0.4244 | 0.3990 | 94.62 | 232.98 | 13.87 | 566.66 | 361.28 | 12.58 | 94 |
| 2700 | 0.4600 | 0.4127 | 105.03 | 165.41 | 6.93 | 589.33 | 321.54 | 8.93 | 95 |

The above color temperature control method for a stage lamp can obtain color coordinates and illuminance of each monochromatic lamp, and obtain, based on the illuminance and an illuminance proportion of a color temperature, initial illuminance data of the monochromatic lamp at the current color temperature; calculate a coordinate difference between target color coordinates and mixed color coordinates obtained by performing illuminance mixing on the initial illuminance data; when the coordinate difference is within a first difference range, calculate illuminance changes of R and B based on the mixed color coordinates, the target color coordinates, correction coordinates of R, and correction coordinates of B; and obtain latest channel values of R and B based on the illuminance changes of R and B, and regulate, based on the latest channel values, the color temperature of each monochromatic lamp on which color mixing is performed. In this way, color temperatures of lamps with different lamp beads are consistent, improving reliability of color rendering of the lamps. In this embodiment of the present disclosure, when the coordinate difference between the color coordinates obtained after illuminance mixing and the target color coordinates is within the first difference range, the illuminance changes of R and B are calculated based on the mixed color coordinates, the target color coordinates, the correction coordinates of R, and the correction coordinates of B, to obtain the latest channel values of R and B based on the illuminance changes of R and B, and regulate, based on the latest channel values, the color temperature of each monochromatic lamp on which color mixing is performed. This avoids a problem that there is a difference between same color temperatures of different The illuminance obtaining module 10 is configured to obtain color coordinates and illuminance of each monochromatic lamp, and obtain, based on the illuminance and an illuminance proportion of a color temperature, initial illuminance data of the monochromatic lamp at the current color temperature.

Figure 4:
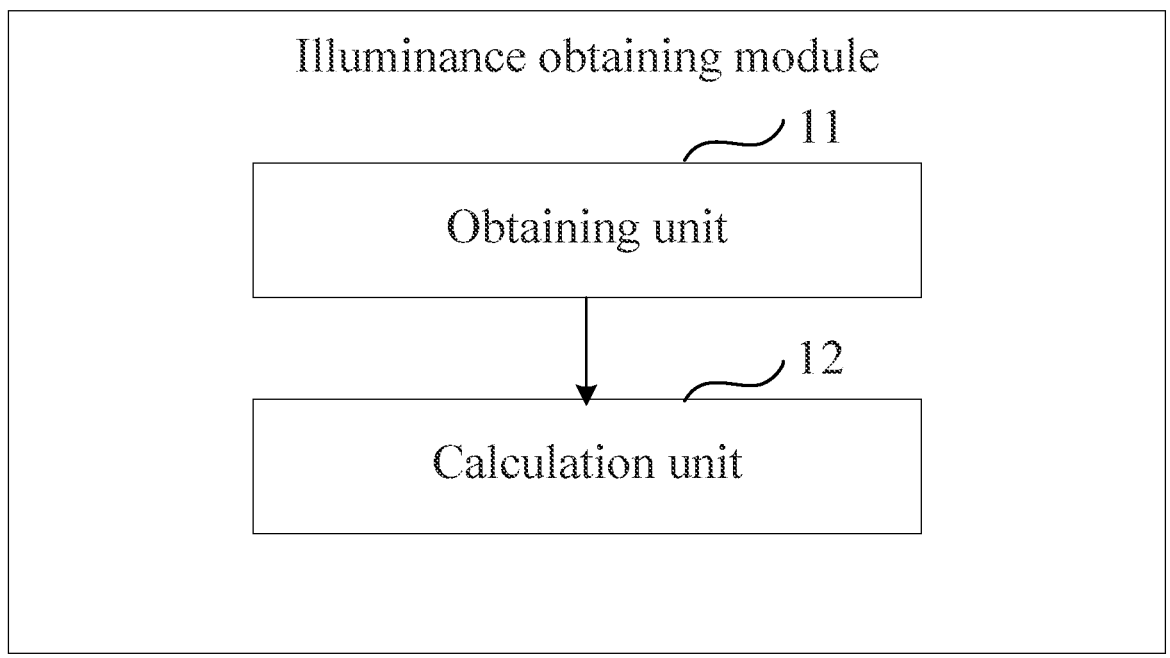
FIG. 4 is a schematic structural diagram of an illuminance obtaining module in FIG. 3.

Further, as shown in FIG. 4, the illuminance obtaining module includes:
- an obtaining unit 11, configured to obtain the illuminance and the color coordinates of each monochromatic lamp, namely, Er and (xr, yr), Eg and (xg, yg), Eb and (xb, yb), Ea and (xa, ya), El and (xl, yl), and Ec and (xc, yc); and
- a calculation unit 12, configured to obtain, based on the illuminance of each monochromatic lamp and illuminance proportions of given color temperatures R100, G100, B100, A100, L100, and C100, initial illuminance data of the monochromatic lamp at the current color temperatures, namely, E*R100, E*G100, E*B100, E*A100, E*L100, and E*C100, where E represents a minimum value of Er/R100, Eg/G100, Eb/B100, Ea/A100, El/L100, and Ec/C100.

The illuminance mixing module 20 is configured to calculate a coordinate difference between target color coordinates and mixed color coordinates obtained by performing illuminance mixing on the initial illuminance data.

Further, the coordinate difference includes a first difference range and a second difference range. The first difference range is 0.003≤ε, and the second difference range is 0≤ε<0.003.

The illuminance change module 30 is configured to: when the coordinate difference is within the first difference range, calculate illuminance changes of R and B based on the mixed color coordinates, the target color coordinates, correction coordinates of R, and correction coordinates of B.

Further, a model for calculating the illuminance changes of R and B based on the mixed color coordinates, the target color coordinates, the correction coordinates of R, and the correction coordinates is as follows:

$$\Delta Eb = Ei * Kb$$

$$\Delta Er = Ei * (1 + Kb) * Er$$

$$Kb = \left(\frac{y - yi}{yb - y} * \frac{yb}{yi}\right)$$

$$Kr = \left(\frac{y0 - y}{yr - y0} * \frac{yr}{y}\right)$$

$$y = \frac{xr - xb + K_1 * yb - K_2 * yr}{K_1 - K_2}, K_1 = \frac{xi - xb}{yi - yb}, K_2 = \frac{x0 - xr}{y0 - yr}$$

where ΔEb and ΔEr represent the illuminance changes, (xi, yi) represents current color coordinates, (x0, y0) (xr, yr) represents the target color coordinates, (xr, yr) represents the correction coordinates of R, and (xb, yb) represents the correction coordinates of B.

Further, the illuminance change module 30 is configured to: when the coordinate difference is within the second difference range, calculate an illuminance value of each color at a given next color temperature based on an illuminance proportion between the given next color temperature and the current color temperature, and perform the step of calculating illuminance changes of R and B based on the mixed color coordinates, the target color coordinates, correction coordinates of R, and correction coordinates of B.

The color temperature regulating module 40 is configured to obtain latest channel values of R and B based on the illuminance changes of R and B, and regulate, based on the latest channel values, the color temperature of each monochromatic lamp on which color mixing is performed.

Specifically, the latest channel values of R and B are obtained based on current illuminance and corresponding illuminance changes of the lamp in the colors R and B respectively, and the color temperature of each monochromatic lamp on which color mixing is performed is overridden and replaced based on the latest channel values.

In this embodiment of the present disclosure, the illuminance mixing module 20 and the illuminance change module 30 each may be one or more processors or controllers that have a communication interface to implement a communications protocol, and may further include a memory and relevant interfaces, a system transmission bus, and the like if necessary. The one or more processors or controllers execute program-related code to implement corresponding functions. The illuminance obtaining module 10 may include a lamp test device and one or more processors or controllers that have a communication interface to implement a communications protocol, and may further include a memory and relevant interfaces, a system transmission bus, and the like if necessary. The one or more processors or controllers execute program-related code to implement corresponding functions. The lamp test device can be a spectral color illuminometer with a built-in light detector, which can test the illuminance, color coordinate, color temperature, color rendering index and other parameters of the lamp. The color temperature regulating module 40 may be one or more controllers that have a communication interface to implement a communications protocol, and may further include a memory and relevant interfaces, a system transmission bus, and the like if necessary. The one or more controllers execute program-related code to implement corresponding functions. Specifically, the controller includes communication IC, ST single-chip microcomputer and control programs, which can transmit signals to control the light output of the lamp. The obtaining unit 11 may be a lamp test device commonly used in the art, such as a spectral color illuminometer. The calculation unit 12 may be one or more processors or controllers that have a communication interface to implement a communications protocol, and may further include a memory and relevant interfaces, a system transmission bus, and the like if necessary. The one or more processors or controllers execute program-related code to implement corresponding functions.

For a specific limitation on the color temperature control system for a stage lamp, refer to the above limitation on the color temperature control method for a stage lamp. Details are not described again herein. Various modules in the above color temperature control system for a stage lamp may be implemented fully or partially through software, hardware, and a combination thereof. Each of the foregoing modules may be embedded in or independent of a processor in a computer device in a form of hardware, or may be stored in a memory in the computer device in a form of software to enable the processor to conveniently call and execute operations corresponding to each of the foregoing modules.

The above color temperature control system for a stage lamp can obtain color coordinates and illuminance of each monochromatic lamp, and obtain, based on the illuminance and an illuminance proportion of a color temperature, initial illuminance data of the monochromatic lamp at the current color temperature; calculate a coordinate difference between target color coordinates and mixed color coordinates obtained by performing illuminance mixing on the initial illuminance data; when the coordinate difference is within a first difference range, calculate illuminance changes of R and B based on the mixed color coordinates, the target color coordinates, correction coordinates of R, and correction coordinates of B; and obtain latest channel values of R and B based on the illuminance changes of R and B, and regulate, based on the latest channel values, the color temperature of each monochromatic lamp on which color mixing is performed. In this way, color temperatures of lamps with different lamp beads are consistent, improving reliability of color rendering of the lamps. In this embodiment of the present disclosure, when the coordinate difference between the color coordinates obtained after illuminance mixing and the target color coordinates is within the first difference range, the illuminance changes of R and B are calculated based on the mixed color coordinates, the target color coordinates, the correction coordinates of R, and the correction coordinates of B, to obtain the latest channel values of R and B based on the illuminance changes of R and B, and regulate, based on the latest channel values, the color temperature of each monochromatic lamp on which color mixing is performed. This avoids a problem that there is a difference between same color temperatures of different lamps because a color temperature drift occurs and a color rendering index is decreased due to a difference between lamp beads of different lamps, and satisfies actual application requirements.

Figure 5:
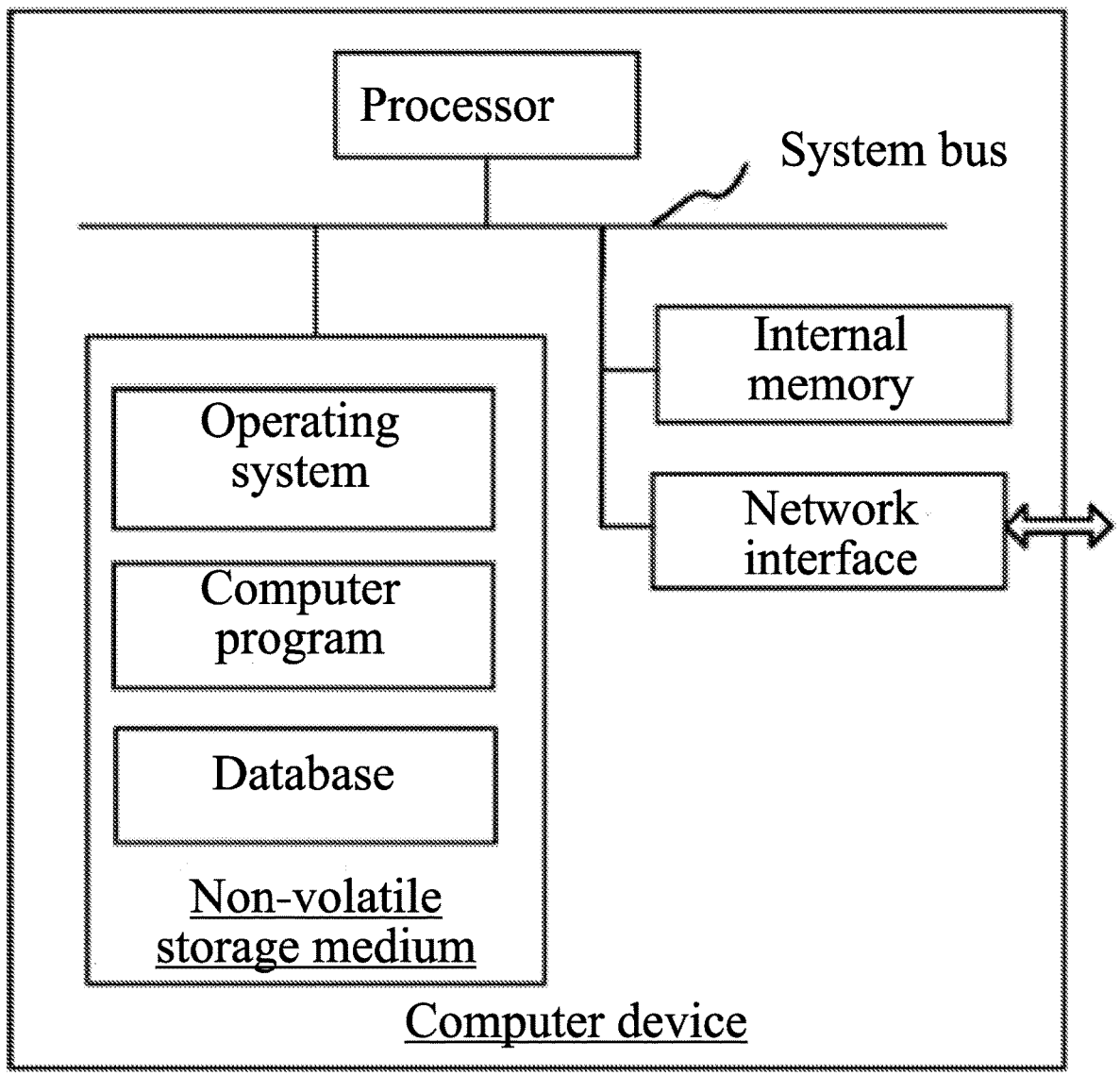
FIG. 5 is an internal structural diagram of a computer device according to an embodiment of the present disclosure.

In an embodiment, a computer device is provided. The computer device may be a server, and an internal structure thereof may be as shown in FIG. 5. The computer device includes a processor, a memory, a network interface, and a database that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides a running environment for the operating system and the computer program in the non-volatile storage medium. The database of the computer device is configured to store data. The network interface of the computer device is configured to communicate with an external terminal through a network. When the computer program is executed by the processor, a method for interaction between application programs of a terminal is implemented.

Those skilled in the art may understand that the structure shown in FIG. 5 is only a block diagram of a part of the structure related to the solution of the present disclosure and does not constitute a limitation on a computer device to which the solution of the present disclosure is applied. Specifically, the computer device may include more or less components than those shown in the figure, or combine some components, or have different component arrangements.

In an embodiment, a computer device is provided, including a memory, a processor, and a computer program stored in the memory and executable on the processor. The processor executes the computer program to implement the following steps:

obtaining color coordinates and illuminance of each monochromatic lamp, and obtaining, based on the illuminance and an illuminance proportion of a color temperature, initial illuminance data of the monochromatic lamp at the current color temperature;

calculating a coordinate difference between target color coordinates and mixed color coordinates obtained by performing illuminance mixing on the initial illuminance data;

when the coordinate difference is within a first difference range, calculating illuminance changes of R and B based on the mixed color coordinates, the target color coordinates, correction coordinates of R, and correction coordinates of B; and obtaining latest channel values of R and B based on the illuminance changes of R and B, and regulating, based on the latest channel values, the color temperature of each monochromatic lamp on which color mixing is performed.

In an embodiment, a storage medium storing a computer program is provided. When the computer program is executed by a processor, the following steps are implemented:

obtaining color coordinates and illuminance of each monochromatic lamp, and obtaining, based on the illuminance and an illuminance proportion of a color temperature, initial illuminance data of the monochromatic lamp at the current color temperature;

calculating a coordinate difference between target color coordinates and mixed color coordinates obtained by performing illuminance mixing on the initial illuminance data;

when the coordinate difference is within a first difference range, calculating illuminance changes of R and B based on the mixed color coordinates, the target color coordinates, correction coordinates of R, and correction coordinates of B; and obtaining latest channel values of R and B based on the illuminance changes of R and B, and regulating, based on the latest channel values, the color temperature of each monochromatic lamp on which color mixing is performed.

A person of ordinary skill in the art may understand that all or some of the procedures in the methods of the above embodiments may be implemented by a computer program instructing related hardware. The computer program may be stored in a non-volatile storage medium. When the computer program is executed, the procedures in the embodiments of the foregoing methods may be performed. Any reference used for a memory, a storage, a database, or another storage medium used in various embodiments provided in the present disclosure may include a non-volatile memory and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM can be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus (Rambus) direct RAM (RDRAM), a direct Rambus dynamic RAM (DRDRAM), and a Rambus dynamic RAM (RDRAM).

It should be understood that the present disclosure may be implemented by using hardware, software, firmware, or a combination thereof. In the above implementations, a plurality of steps or methods may be implemented by using software or firmware that is stored in a memory and that is executed by a proper instruction execution system. For example, if the hardware is used for implementation, as shown in another implementation, any one or a combination of the following technologies known in the art may be used: a discrete logic circuit having a logic gate used to implement a logical function for a data signal, an application-specific integrated circuit having proper combined logic gates, a programmable gate array (PGA), a field programmable gate array (FPGA), and the like.

In this specification, the description of "one embodiment", "some embodiments", "an example", "a specific example" and "some examples" means that a specific feature, structure, material or characteristic described in combination with the embodiment(s) or example(s) is included in at least one embodiment or example of the present disclosure. In this specification, the schematic representation of the above terms does not necessarily refer to the same embodiment or example. Moreover, the specific feature, structure, material or characteristic described may be combined in any suitable manner in any one or more embodiments or examples.

The technical features of the above embodiments may be combined arbitrarily. In order to make the description of the embodiments concise, it is impossible to describe all possible combinations of the technical features of the embodiments. However, all possible combinations of the technical features should be understood as falling within the scope of the present disclosure as long as no contradiction occurs.

The above embodiments are merely intended to describe several implementations of the present disclosure, and the description thereof is more specific and detailed, but is not to be construed as a limitation on the patentable scope of the present disclosure. It should be pointed out that several variations and improvements can be made by those of ordinary skill in the art without departing from the conception of the present disclosure, but such variations and improvements should fall within the protection scope of the present disclosure. Therefore, the protection scope of the patent of the present disclosure should be subject to the appended claims.

The invention claimed is:

1. A color temperature control method for a stage lamp, wherein the stage lamp comprises LEDs of a plurality of colors, a monochromatic lamp is the stage lamp when the LED of one color of the plurality of colors is turned on, and the method comprises the following steps:
obtaining color coordinates and illuminance of each monochromatic lamp, and obtaining, based on the illuminance and an illuminance proportion of a color temperature, initial illuminance data of the monochromatic lamp at a current color temperature;
calculating a coordinate difference (ε) between target color coordinates and mixed color coordinates obtained by performing illuminance mixing on the initial illuminance data;
when the coordinate difference (ε) is within a first difference range, calculating illuminance changes of red monochromatic lamp (R) and blue monochromatic lamp (B) based on the mixed color coordinates, the target color coordinates, color coordinates of R, and color coordinates of B; and
obtaining latest illuminance of R and B based on the illuminance changes of R and B, and regulating, based on the latest illuminance, the color temperature of each monochromatic lamp on which color mixing is performed;
when the coordinate difference (ε) is within a second difference range, calculating an illuminance value of each color of the plurality of colors at a given next color temperature based on the given next color temperature and an illuminance proportion of the current color temperature, and performing the step of calculating illuminance changes of R and B based on the mixed color coordinates, the target color coordinates, color coordinates of R, and color coordinates of B.

2. The color temperature control method for a stage lamp according to claim 1, wherein a method for obtaining, based on the illuminance and the illuminance proportion of the color temperature, the initial illuminance data of the monochromatic lamp at the current color temperature comprises:
obtaining the illuminance and the color coordinates of each monochromatic lamp, namely, Er and (xr, yr), Eg and (xg, yg), Eb and (xb, yb), Ea and (xa, ya), El and (xl, yl), and Ec and (xc, yc); and
obtaining, based on the illuminance of each monochromatic lamp and illuminance proportions of given color temperatures R100, G100, B100, A100, L100, and C100, initial illuminance data of the monochromatic lamp at the current color temperatures, namely, E*R100, E*G100, E*B100, E*A100, E*L100, and E*C100, wherein E represents a minimum value of Er/R100, Eg/G100, Eb/B100, Ea/A100, El/L100, and Ec/C100.

3. The color temperature control method for a stage lamp according to claim 1, wherein a model for calculating the illuminance changes of R and B based on the mixed color coordinates, the target color coordinates, the color coordinates of R, and the color coordinates of B is as follows:

$$\Delta Eb = Ei * Kb$$

$$\Delta Er = Ei * (1 + Kb) * Er$$

$$Kb = \left(\frac{y - yi}{yb - y} * \frac{yb}{yi}\right)$$

$$Kr = \left(\frac{y0 - y}{yr - y0} * \frac{yr}{y}\right)$$

$$y = \frac{xr - xb + K_1 * yb - K_2 * yr}{K_1 - K_2}, K_1 = \frac{xi - xb}{yi - yb}, K_2 = \frac{x0 - xr}{y0 - yr}$$

wherein ΔEb and ΔEr represent the illuminance changes, (xi, yi) represents current color coordinates, (x0, y0) represents the target color coordinates, (xr, yr) represents the color coordinates of R, and (xb, yb) represents the color coordinates of B.

4. The color temperature control method for a stage lamp according to claim 1, wherein a method for obtaining the latest illuminance of R and B based on the illuminance changes of R and B, and regulating, based on the latest illuminance, the color temperature of each monochromatic lamp on which color mixing is performed comprises:
obtaining the latest illuminance of R and B based on current illuminance and corresponding illuminance changes of the lamp in the colors R and B respectively, and overriding and replacing, based on the latest illuminance, the color temperature of each monochromatic lamp on which color mixing is performed.

5. The color temperature control method for a stage lamp according to claim 1, wherein the first difference range is 0.003≤ε, and the second difference range is 0≤ε<0.003.

6. A computer device, comprising a memory, a processor, and a computer program stored in the memory and executable on the processor, wherein the processor implements the steps of the method according to claim 1 when executing the computer program, and wherein the processor controls an illuminance obtaining module to obtain the color coordinates and illuminance of each monochromatic lamp.

7. A non-transitory storage medium storing a computer program, wherein the steps of the method according to claim 1 are implemented when the computer program is executed by a processor.

8. A color temperature control system for a stage lamp, wherein the stage lamp comprises LEDs of a plurality of colors, a monochromatic lamp is the stage lamp when the LED of one color of the plurality of colors is turned on, and the system comprises:
an illuminance obtaining module, configured to obtain color coordinates and illuminance of each monochromatic lamp, and obtain, based on the illuminance and an illuminance proportion of a color temperature, initial illuminance data of the monochromatic lamp at a current color temperature;
an illuminance mixing module, configured to calculate a coordinate difference (ε) between target color coordinates and mixed color coordinates obtained by performing illuminance mixing on the initial illuminance data;
an illuminance change module, configured to: when the coordinate difference (ε) is within a first difference range, calculate illuminance changes of red monochromatic lamp (R) and blue monochromatic lamp (B)

based on the mixed color coordinates, the target color coordinates, color coordinates of R, and color coordinates of B; and a color temperature regulating module, configured to obtain latest illuminance of R and B based on the illuminance changes of R and B, and regulate, based on the latest illuminance, the color temperature of each monochromatic lamp on which color mixing is performed, wherein the illuminance obtaining module comprises:

an obtaining unit, configured to obtain the illuminance and the color coordinates of each monochromatic lamp, namely, Er and (xr, yr), Eg and (xg, yg), Eb and (xb, yb), Ea and (xa, ya), El and (xl, yl), and Ec and (xc, yc); and a calculation unit, configured to obtain, based on the illuminance of each monochromatic lamp and illuminance proportions of given color temperatures R100, G100, B100, A100, L100, and C100, initial illuminance data of the monochromatic lamp at the current color temperatures, namely, E*R100, E*G100, E*B100, E*A100, E*L100, and E*C100, wherein E represents a minimum value of Er/R100, Eg/G100, Eb/B100, Ea/A100, El/L100, and Ec/C100.

* * * * *